(12) United States Patent
Deutesfeld

(10) Patent No.: US 8,547,996 B2
(45) Date of Patent: Oct. 1, 2013

(54) SELF LEARNING PERFORMANCE OPTIMIZED DATA TRANSFER VIA ONE OR SEVERAL COMMUNICATION CHANNELS BETWEEN SYSTEMS

(75) Inventor: Andreas Deutesfeld, Altlussheim (DE)

(73) Assignee: SAP AG, Walldorf (DE)

( * ) Notice: Subject to any disclaimer, the term of this patent is extended or adjusted under 35 U.S.C. 154(b) by 1365 days.

(21) Appl. No.: 11/641,472

(22) Filed: Dec. 18, 2006

(65) Prior Publication Data

US 2008/0144653 A1 Jun. 19, 2008

(51) Int. Cl.
*H04J 3/22* (2006.01)

(52) U.S. Cl.
USPC .......................................... 370/465

(58) Field of Classification Search
USPC ......................................... 370/465, 466, 467
See application file for complete search history.

(56) References Cited

U.S. PATENT DOCUMENTS

| | | | |
|---|---|---|---|
| 5,732,240 A * | 3/1998 | Caccavale | 711/118 |
| 6,480,497 B1 * | 11/2002 | Flammer et al. | 370/400 |
| 6,795,851 B1 * | 9/2004 | Noy | 709/218 |
| 6,973,622 B1 * | 12/2005 | Rappaport et al. | 715/735 |
| 7,197,315 B1 * | 3/2007 | Stephens et al. | 455/450 |
| 7,327,697 B1 * | 2/2008 | Friday et al. | 370/278 |
| 7,340,477 B1 * | 3/2008 | Tolbert et al. | 707/102 |
| 7,412,402 B2 * | 8/2008 | Cooper | 705/11 |
| 7,636,550 B2 * | 12/2009 | Yuen et al. | 455/62 |
| 2003/0189950 A1 * | 10/2003 | Spear et al. | 370/466 |

* cited by examiner

*Primary Examiner* — Mark Rinehart
*Assistant Examiner* — Mohammad Anwar
(74) *Attorney, Agent, or Firm* — Mintz Levin Cohn Ferris Glovsky and Popeo, P.C.

(57) ABSTRACT

A system and method for optimizing data transfers in requests from a calling system to a called system via one or more channels are disclosed. Performance data related to a set of performance metrics for one or more communication scenarios of the calling system are stored in a database. The performance data is analyzed based on the performance metrics. An optimal channel is determined from the one or more channels on which a data transfer should occur based on the analyzing the performance data. A communication type is determined for the optimal channel.

19 Claims, 3 Drawing Sheets

SELF LEARNING PERFORMANCE OPTIMIZED DATA TRANSFER VIA ONE OR SEVERAL COMMUNICATION CHANNELS BETWEEN SYSTEMS

BACKGROUND

This disclosure relates generally to computer-based mechanisms for exchanging data between two systems, and more particularly to techniques for self-learning performance-optimize data transfer between two systems via one or more communication channels.

FIG. 1 illustrates a generic system landscape 100 in which a calling system (System A 102) sends requests to called system (System B 104). System A 102 and System B 104 can be two separate computing systems, or may be two separate servers in one computing system. System A 102 includes a client 106, such as an application, and a communicator 108 through which the client 106 sends the requests to System B 104. The communicator 108 includes logic and interfaces for one or more channels 110. Each channel 110 represents the physical media, such as cable or wireless media, and the communication type or protocol to be used, such as the Hypertext Transmission Protocol (HTTP), Simple Message Transfer Protocol (SMTP), Remote Function Call (RFC), or the like.

The request can include data. For synchronous communications, in which an immediate response is more or less expected, and depending on the capacity of the channel 110 being used, if the data is large it may optionally be first deposited into a common repository 112, such as a database or file system. System A 102 need only send a reference to the data in the request via the channel 110. System B 104 can use the reference to access the data from the common repository 112. At a time when it is convenient or allowable to do so, such as a weekend or other low-use times, System B 104 can simply use the channel 110 to receive the data.

Considerations for data exchanges include CPU processing time or speed, memory usage, network usage and/or bandwidth, and costs such as channel, storage, or transmission costs. Usually, these considerations are taken into account and hard-coded during design time of communication scenarios of an application or business process. However, such an approach does not achieve an optimal way to exchange data, and which is generic for all purposes.

SUMMARY

In general, this document discusses a system and method for self-learning, performance-optimized data transfer via one or more communication channels. In one aspect, a system for optimizing data transfers in requests from a calling system to a called system via one or more channels includes a performance metrics database storing performance data related to a set of performance metrics for one or more communication scenarios of the calling system. The system further includes an optimizer that polls the performance metrics database, analyzes the performance data based on the performance metrics, determines an optimal channel from the one or more channels on which a data transfer should occur based on the analysis, and determines a communication type for the optimal channel.

In another aspect, a method for optimizing data transfers in requests from a calling system to a called system via one or more channels includes the steps of storing performance data related to a set of performance metrics for one or more communication scenarios of the calling system, and analyzing the performance data based on the performance metrics. The method further includes the steps of determining an optimal channel from the one or more channels on which a data transfer should occur based on the analyzing the performance data, and determining a communication type for the optimal channel.

In another aspect, a computer-implemented method for optimizing data transfers in requests from a calling system to a called system via one or more channels includes storing performance data related to a set of performance metrics in a database, the set of performance metrics being associated with one or more communication scenarios of the calling system. The computer-implemented method further includes polling the database to retrieve a selection of the performance data, determining an optimal channel from the one or more channels on which a data transfer should occur based on the selection of the performance data, and determining a communication type for the optimal channel based on the selection of the performance data.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
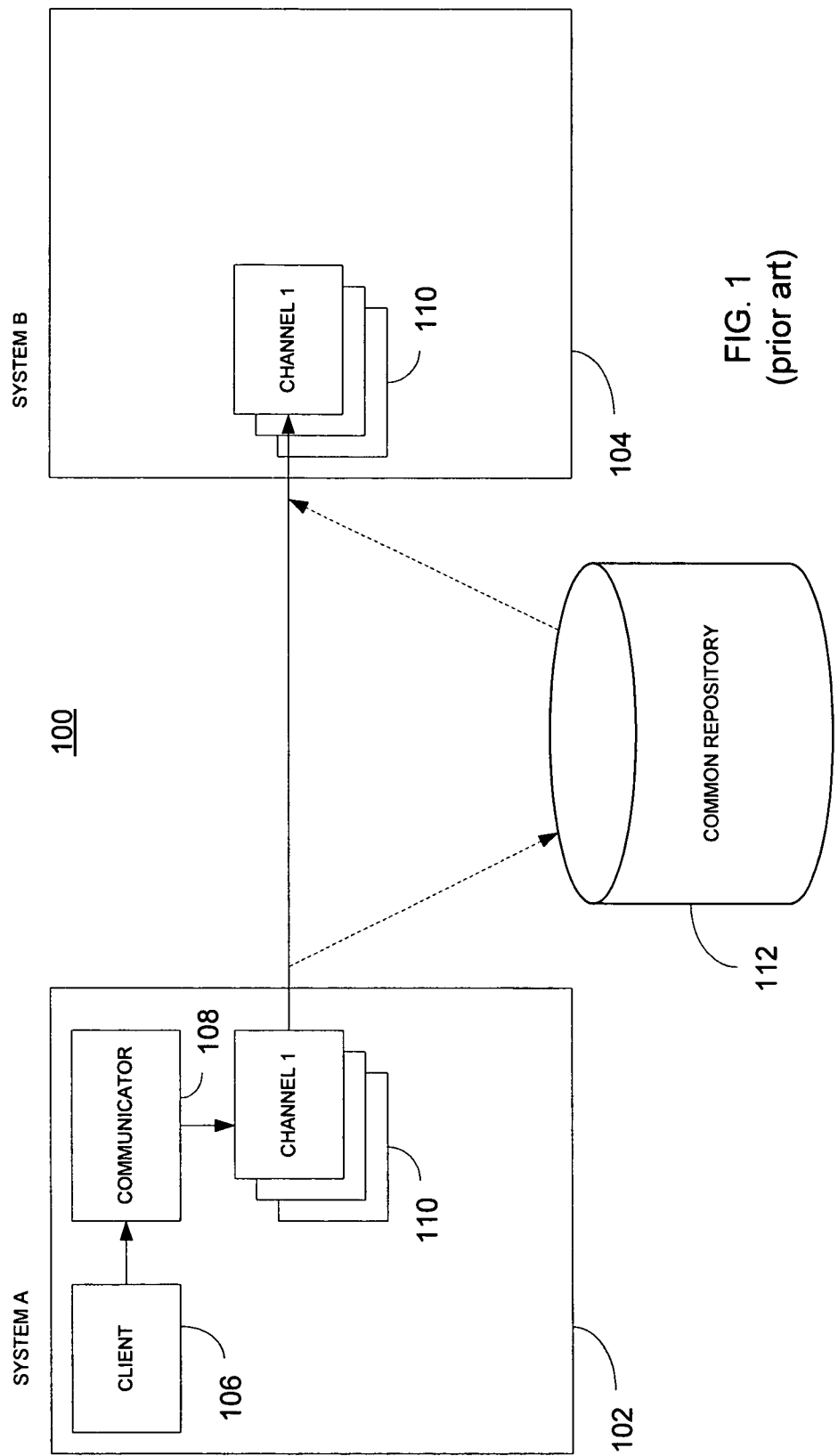
FIG. 1 is a block diagram of a communication system landscape.
Figure 2:
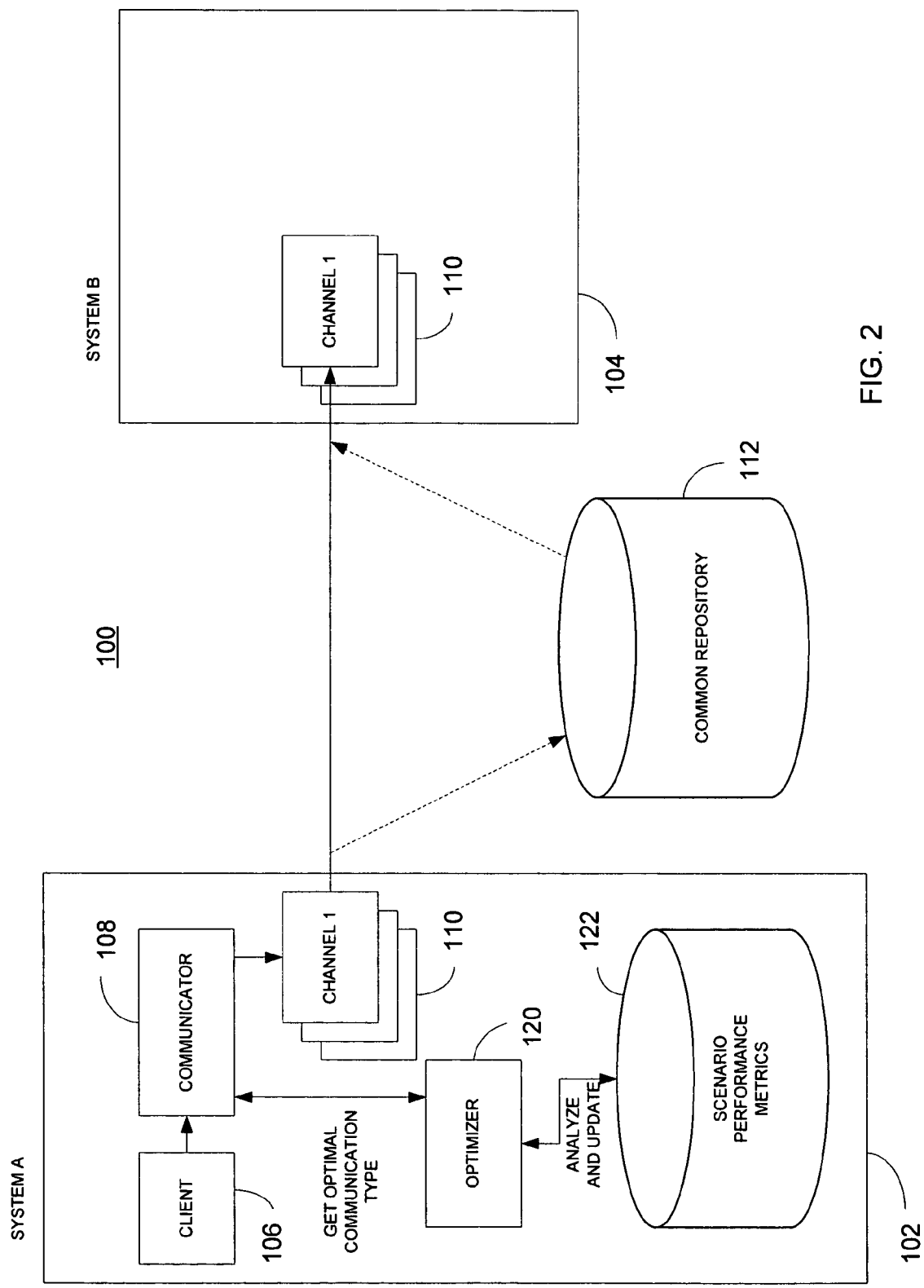
FIG. 2 is a block diagram of a communication system landscape including an optimization system.

This document describes a communication optimization system and method. An optimal data transfer depends on at least the actual system configuration, communication scenario, and the amount of data being exchanged.

In accordance with preferred implementations, calling System A 102 includes an optimizer 120 and a scenario performance metrics database 122. The scenario performance metrics database 122 stores performance metrics for the one or more channels 110 and data transfers by the calling system 102. For a data transfer, the optimizer 120 runs an initialization process. The initialization process polls the scenario performance metrics database 122 and determines the types of channels 10 that are available and the size of the data to be transferred, and analyzes CPU usage and other hardware metrics if desired. Optionally, the optimizer 120 could protocol and evaluate metrics from System B 104 as well, if available.

Based on the initialization process, the optimizer 120 determines an optimal channel from the one or more channels 110 for the data transfer, and determines a communication type (HTTP, SMPT, RFC, etc.) that is best for the optimal channel. The optimizer 120 may also decide whether to pass data over the selected optimal channel, or to just send a reference to the data stored in the common repository 112.

The optimizer 120 then monitors the scenario for new performance data of the data transfer (e.g. size of transferred data, elapsed time, CPU time, network time, memory consumption, etc.), and updates the scenario performance metrics database 112 with at least a subset of the new performance data. Each scenario can include a unique identifier at the calling system which provides a number of performance characteristics for the scenario's performance data. The performance metrics in the scenario performance metrics database 122 can be averaged for several requests to reduce statistical errors. Further, any of the performance metrics can be weighted or scaled depending on the desired performance outcome for the system.

The initialization process need not be run for subsequent data transfers, but can be run in the event of a hardware or other system change, or may be set to run periodically. For example, if a subsequent data transfer involves an amount of data that is different from the previous data transfer, the optimizer 120 can poll the scenario performance metrics database 112 again to determine if another of the one or more channels is more suitable. Accordingly, the calling System A includes a communication optimization system that is self-learning, and which continuously, dynamically adjusts communication to the optimum scenario including communication channel and communication type.

Figure 3:
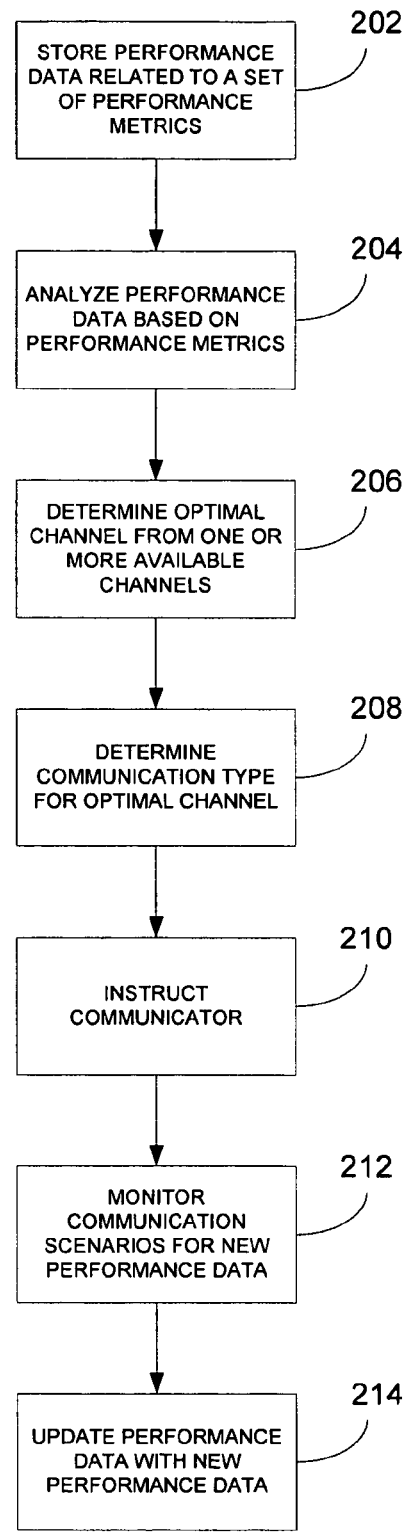
FIG. 3 is a flowchart of a communication optimization method.

FIG. 3 is a flowchart of a method 200 for a method for optimizing data transfers in requests from a calling system to a called system via one or more channels. At 202, performance data related to a set of performance metrics are stored. The performance metrics are associated with one or more communication scenarios—i.e. communication channel used, communication type employed, whether data is transferred or just a reference is sent, etc. The performance data is preferably stored in a database, and can be weighted or scaled based on desired performance parameters of the calling system.

At 204, the performance data is analyzed according to the performance metrics. At 206, an optimal channel is determined from one or more available channels, based on the analysis of performance data. At 208, a communication type is determined for the optimal channel. At 210, a communicator having an interface with the one or more channels is instructed as to the determined channel and communication type. Thereafter, data transfers will be executed on the selected channel and according to the communication type.

At 212, one or more communication scenarios are monitored, and new performance data is collected. At 214, the performance data is updated with the new performance data, and made available for future, preferably regular analyses and channel selection. The method 200 may return at 202 or any step thereafter for self-learning and optimization of communication scenarios.

Implementation of the optimization system and method and all of the functional operations described in this specification can be implemented in digital electronic circuitry, or in computer software, firmware, or hardware, including the structures disclosed in this specification and their structural equivalents, or in combinations of them. The optimization system and method can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The optimization system and method can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for optimizing data transfers in requests from a calling system to a called system via one or more channels, the system comprising:
    a performance metrics database stored on a non-transitory computer-readable medium and storing performance data related to a set of performance metrics for one or more communication scenarios of the calling system, each of the one or more communication scenarios defining at least one medium from a plurality of media and at least one communication type for the at least one medium; and
    an optimizer implemented by one or more processors, the optimizer configured to poll the performance metrics database,
    analyze the performance data based on the performance metrics, determine an optimal communication scenario including at least an optimal channel and a communication type for the optimal channel, the optimal channel selected from the one or more channels on which a data transfer should occur based on the analysis, and being one medium of the plurality of media, monitor the optimal communication scenario for new performance data associated with the data transfer on the optimal channel, and determine a new optimal channel and a new communication type for the new optimal channel when a subsequent data transfer occurs, the subsequent data transfer dynamically continuing on the new optimal channel and in accordance with the new communication type.

2. A system in accordance with claim 1, further comprising a communication interface that selects the optimal channel and communication type for communication based on the determination of the optimizer.

3. A system in accordance with claim 1, wherein the determining of the new optimal channel and the new communication type is performed when the new performance data is different from the performance data.

4. A system in accordance with claim 1, wherein the optimizer is further configured to update the performance metrics database with the new performance data.

5. A system in accordance with claim 1, wherein the performance data in the performance metrics database is averaged for two or more requests.

6. A system in accordance with claim 1, wherein the performance data in the performance metrics database is weighted for a particular communication scenario.

7. A system in accordance with claim 1, wherein the performance data includes CPU time information and memory usage information.

8. A computer-implemented method for optimizing data transfers in requests from a calling system to a called system via one or more channels, the method being executed by one or more data processors and comprising:
    storing, by one or more of the data processors, performance data related to a set of performance metrics for one or more communication scenarios of the calling system, each of the one or more communication scenarios defining at least one medium from a plurality of media and at least one communication type for the at least one medium;
    analyzing, by one or more of the data processors, the performance data based on the performance metrics;
    determining, by one or more of the data processors, an optimal communication scenario including an optimal channel and a communication type for the optimal channel, the optimal channel selected from the one or more channels on which a data transfer should occur based on the analyzing the performance data and being one medium of the plurality of media;
    monitoring, by one or more of the data processors, the optimal communication scenario for new performance data associated with the data transfer on the optimal channel; and
    determining, by one or more of the data processors, a new optimal channel and a new communication type for the optimal channel when a subsequent data transfer occurs, the subsequent data transfer dynamically continuing on the new optimal channel and in accordance with the new communication type.

9. A method in accordance with claim 8, further comprising instructing, by one or more of the data processors, a communicator having a communication interface as to the optimal channel and communication type.

10. A method in accordance with claim 8, further comprising updating, by one or more of the data processors, the performance data with the new performance data.

11. A method in accordance with claim 8, wherein the set of performance metrics includes CPU time and memory usage.

12. A method in accordance with claim 8, further comprising executing, by one or more of the data processors, the data transfer on the optimal channel and in accordance with the communication type, wherein the communication type is a communication protocol including one of hypertext transmission protocol, simple message transfer protocol, and remote function call.

13. A method in accordance with claim 12, wherein the data transfer includes a data reference sent in a request from the calling system to the called system.

14. A computer-implemented method for optimizing data transfers in requests from a calling system to a called system via one or more channels, the method comprising:

storing performance data related to a set of performance metrics in a database stored on a computer-readable medium, the set of performance metrics being associated with one or more communication scenarios of the calling system, each of the one or more communication scenarios defining at least one medium from a plurality of media and at least one communication type for the at least one medium;

polling the database to retrieve a selection of the performance data;

determining an optimal communication scenario including at least an optimal channel and a communication type for the optimal channel based on the selection of the performance data, the optimal channel selected from the one or more channels on which a data transfer should occur based on the selection of the performance data and being one medium of the plurality of media;

monitoring the optimal communication scenario for new performance data associated with the data transfer on the optimal channel; and determining, by the optimizer, a new optimal channel and a new communication type for the optimal channel when a subsequent data transfer occurs, the subsequent data transfer dynamically continuing on the new optimal channel and in accordance with the new communication type.

15. A computer-implemented method in accordance with claim 14, further comprising updating the performance data in the database with the new performance data.

16. A computer-implemented method in accordance with claim 14, further comprising processing the performance data in the database to account for desired performance parameters.

17. A computer-implemented method in accordance with claim 16, wherein the processing includes averaging performance data from two or more communication scenarios.

18. A computer-implemented method in accordance with claim 14, wherein the set of performance metrics includes CPU time and memory usage.

19. A non-transitory computer-readable medium containing instructions to configure a processor to perform operations comprising:

storing performance data related to a set of performance metrics for one or more communication scenarios of a calling system, each of the one or more communication scenarios defining at least one medium from a plurality of media and at least one communication type for the at least one medium;

analyzing the performance data based on the performance metrics;

determining an optimal communication scenario from the one or more communication scenarios, the optimal communication scenario including an optimal channel and a communication type for the optimal channel, the optimal channel selected from the one or more channels on which a data transfer should occur based on the analyzing the performance data and being one medium of the plurality of media;

monitoring the optimal communication scenario for new performance data associated with the data transfer on the optimal channel; and determining a new optimal channel and a new communication type for the optimal channel when a subsequent data transfer occurs, the subsequent data transfer dynamically continuing on the new optimal channel and in accordance with the new communication type.

* * * * *